(12) United States Patent
Adams

(10) Patent No.: US 7,956,137 B2
(45) Date of Patent: Jun. 7, 2011

(54) LOOP REACTOR FOR EMULSION POLYMERISATION

(75) Inventor: David Charles Adams, Darwen (GB)

(73) Assignee: Celanese International Corporation, Wilmington, DE (US)

( * ) Notice: Subject to any disclaimer, the term of this patent is extended or adjusted under 35 U.S.C. 154(b) by 374 days.

(21) Appl. No.: 12/160,716

(22) PCT Filed: Jan. 9, 2007

(86) PCT No.: PCT/EP2007/050159
§ 371 (c)(1),
(2), (4) Date: Jul. 11, 2008

(87) PCT Pub. No.: WO2007/080161
PCT Pub. Date: Jul. 19, 2007

(65) Prior Publication Data
US 2010/0252073 A1 Oct. 7, 2010

(30) Foreign Application Priority Data
Jan. 13, 2006 (EP) .................................. 06100328

(51) Int. Cl.
*B01J 19/18* (2006.01)
*C08F 2/01* (2006.01)
*B08B 9/027* (2006.01)
*B08B 3/04* (2006.01)

(52) U.S. Cl. ............ 526/64; 526/74; 422/131; 422/132; 422/138; 134/22.11; 134/22.14; 134/22.19; 134/166 R

(58) Field of Classification Search ................... 422/131, 422/132, 138; 526/64, 74; 134/22.11, 22.14, 134/22.19, 166 R
See application file for complete search history.

(56) References Cited

U.S. PATENT DOCUMENTS

| 3,425,083 A | 2/1969 | Wennerberg et al. |
| 3,682,186 A | 8/1972 | Howe |
| 3,773,470 A * | 11/1973 | Rouzier ........................ 422/110 |

FOREIGN PATENT DOCUMENTS

| DE | 32 33 557 | 3/1984 |
| EP | 0 633 061 | 1/1995 |
| WO | WO 97/15406 | 5/1997 |
| WO | WO 99/23438 | 5/1999 |
| WO | WO 00/07177 | 2/2000 |
| WO | WO 2006/048408 | 5/2006 |

OTHER PUBLICATIONS

Wilkinson et al., "An Award Winning Process," *Chemistry in Britain*, pp. 1050-1052, Dec. 1993.
International Search Report, International Application No. PCT/EP2007/050159, mailed Mar. 28, 2007.
Written Opinion of the International Searching Authority and International Preliminary Report on Patentability, International Application No. PCT/EP2007/050159, mailed May 16, 2008.

* cited by examiner

*Primary Examiner* — Jennifer A Leung
(74) *Attorney, Agent, or Firm* — Roberts Mlotkowski Safran & Cole P.C.

(57) ABSTRACT

A polymerisation reactor comprising one or more circulation loops with one or more inlets for raw material, one or more outlets, and a circulation pump for circulating a reactor charge within the circulation loop. A by-pass line for by-passing the circulation pump connects a point of the loop upstream of the pump with a point downstream of the pump, both points being provided with a three way valve.

20 Claims, 1 Drawing Sheet

LOOP REACTOR FOR EMULSION POLYMERISATION

Figure 1:
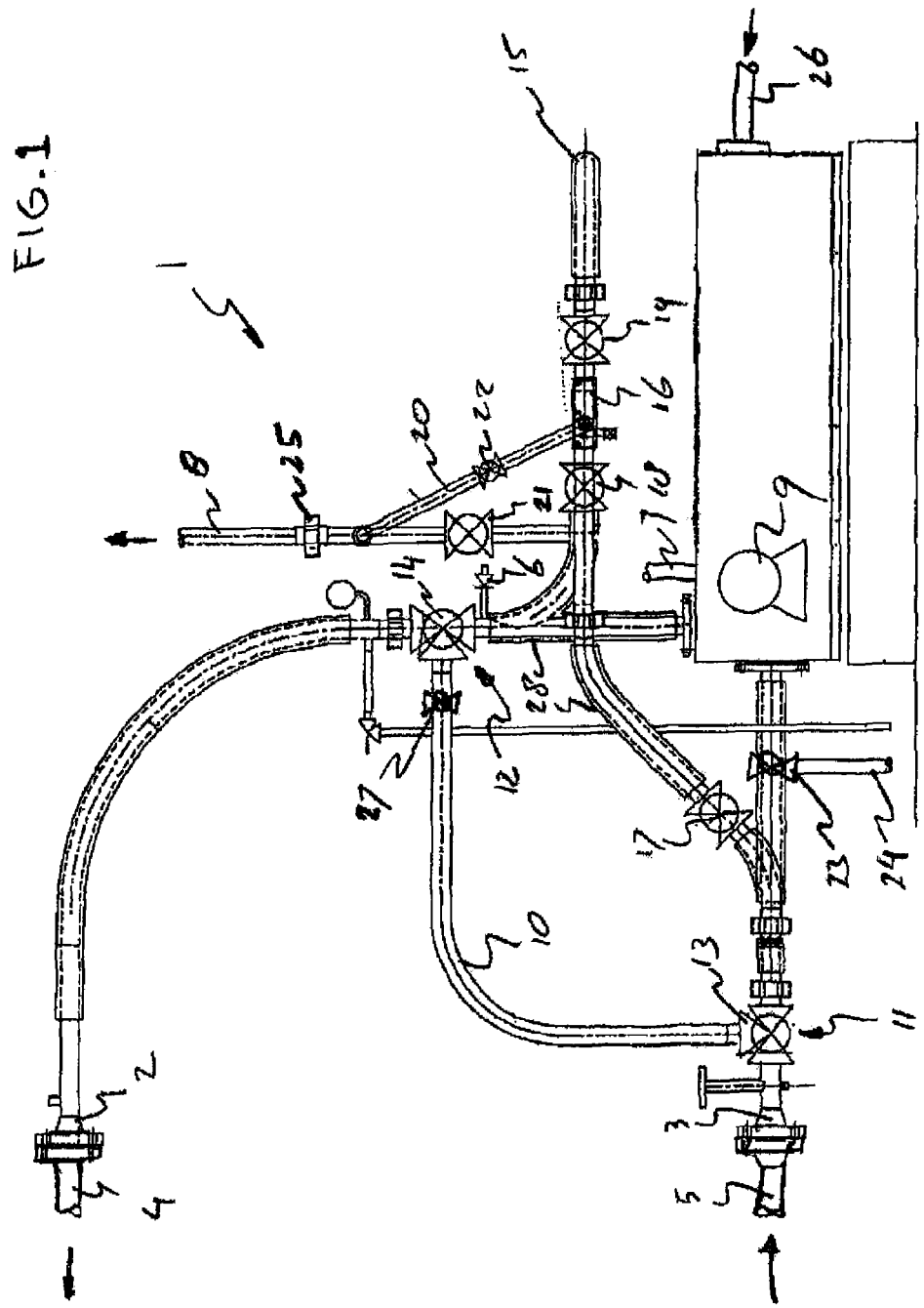

The present invention relates to a polymerisation reactor comprising one or more circulation loops with one or more inlets for raw material, one or more outlets, and a circulation pump for circulating a reactor charge within the circulation loop.

WO 00/07177 discloses a loop reactor for emulsion polymerisation. The loop reactor comprises a circulation pump and a tubular circulation loop connecting the pump's outlet to its inlet. Water, monomers, and stabilisers are continuously fed to the loop and circulated and polymer emulsion is continuously drawn off. The reactor is particularly suitable for the production of polymers derived from vinyl and/or acrylic monomers, used for instance in paints or adhesives.

A problem encountered in polymerisation processes employing a tubular reactor is the formation of deposits from the reaction products on the internal wall of the reactor. These deposits lead to a need for an increased delivery pressure from the circulation pump and impair heat transfer from the reaction medium to, e.g., a coolant in a jacket surrounding the reactor tube, thus leading to higher and often deleterious reactor temperatures or else necessitating an increased coolant circulation rate, a lower coolant temperature, or a reduced rate of production. Fouling also reduces the reactor volume, increasing both the recycle rate and the shear on the emulsion. This shifts the process conditions, which may have been optimised on a clean reactor. In any case, product properties will drift, nullifying the advantages of consistency of production expected from continuous reactors. In WO 00/07177 cleaning pigs are used for cleaning the inside of the reactor tubes. The cleaning pigs have a diameter which is about the inner diameter of the reactor tube. The pigs are launched from a pig station and propelled through the loop by the polymerising emulsion. Since a pig cannot be permitted to pass through the circulation pump, a by-pass line is provided to by-pass the pigs around this pump.

To clean the parts which cannot be pigged, such as the circulation pump, the reactor is rinsed with cleaning solvent on a regular base. To this end the complete reactor has to be emptied first. Although the solvent cleaning only serves to clean the unpigged section of the loop, the complete loop is filled with cleaning solvent. After cleaning, the solvent is removed and the complete reactor needs to be recharged. This procedure leads to substantial loss of productive time and to high economical and environmental costs.

The object of the invention is to provide a loop reactor which can be cleaned more efficiently using less cleaning solvent.

The object of the invention is achieved by providing a polymerisation reactor according to the opening paragraph having a by-pass line by-passing the circulation pump, which connects a point of the loop upstream with a point of the loop downstream, both points being provided with a three-way valve, to form a short loop comprising the pump, a cleaning solvent inlet and a cleaning solvent discharge. This creates the possibility to short-circuit the pump section, closing off the main coil. Cleaning solvent can be pumped around in the isolated pump section to clean the pump. Due to the fact that now only the short-circuited pump section is solvent cleaned, instead of the complete loop, the amount of cleaning solvent used can be reduced dramatically by more than 90%. Moreover, the main coil does not need to be emptied anymore.

To aid solubilisation of the polymer residues in the section to be cleaned, the section and/or the by-pass line can be provided with jackets connected to a heating medium source, such as heated water, to heat the solvent.

The solvent can for example be re-circulated for about 15 to 45 minutes before it is pumped out of the equipment. Optionally the circuit is refilled for a second wash or alternatively a small bleed of solvent is continuously pumped into the circuit during the cleaning cycle, such that used solvent overflows to a bin or the like.

Some typical monomers suitable for use in the present polymerisation process include, e.g., butyl acrylate, methyl methacrylate, styrene, vinyl acetate, Veova® 9, Veova® 10, (each ex Shell), ethyl acrylate, 2-ethyl hexyl acrylate, ethylene, and vinyl chloride. The addition reaction is initiated by radicals to give a dispersion of high molecular weight polymer particles, usually of 50 to 3,000 nm diameter, suspended in a medium in which the polymer is insoluble, usually water. Common free radical generators include the sodium, potassium, and ammonium salts of peroxodisulphuric acid, e.g. ammonium peroxodisulphate. Alternatively, redox couples can be used. These consist of an oxidising agent and a reducing agent. Commonly used oxidisers are the salts of peroxodisulphuric acid and t-butyl hydroperoxide and hydrogen peroxide itself. Reducers are sodium sulphite, sodium metabisulphite, sodium formaldehyde sulphoxylate, and sodium dithionate.

Polymerisation of monomers can take place in aqueous suspension and, in that case, raw materials are preferably provided by separate feed streams. These streams introduce fresh monomer and an aqueous solution of stabilisers known as the water phase or, e.g., a pre-emulsion of monomer and water and an aqueous solution in a separate small stream. At the start of the reaction the reactor is filled with water phase made up in a solution tank. Other fillings are also possible, particularly finished emulsion polymer (of the same or a different composition) from a previous run, optionally diluted to any concentration.

Agitation in the reactor is provided by virtue of the in-line circulation pump. Shortly after the feed streams start to flow, the monomers begin to react and heat is generated. The temperature is stabilised by cooling means, usually by controlled circulation of a cooling fluid (e.g. water) through a cooling jacket. The product flows to the cooling tank, where residual monomer converts to polymer.

After cooling, the emulsion polymer is filtered to remove any oversize particles or gritty material in the strainer and transferred to the product storage tank.

Optionally, the polymerisation process may be carried out under pressure, for instance under a pressure of 10 to 150 bar. Alternatively, the polymerisation may be carried out at ambient pressure.

Suitable circulation pumps are for instance positive displacement pumps or centrifugal pumps.

The invention is further illustrated by the drawing, which in FIG. 1 shows the pump section of a loop reactor 1, having two outer ends 2, 3 connected to the outer ends 4, 5 of a tubular coiled loop (not shown). The pump section 1 comprises a monomer inlet 6, a water phase inlet 7, and an outlet 8 for finished product. A circulation pump 9 serves as a driving means for circulating a reactor charge within the circulation loop. A by-pass line 10 for by-passing the circulation pump 9 connects a point 11 of the loop upstream of the pump 9 with a point 12 downstream of the pump 9. Both points 11, 12 are provided with a three-way valve 13, 14. A second by-pass line 15 includes a pig station 16 to store one or more pigs at rest. The pig station 16 can be isolated using valves. Downstream of the valve 19, the by-pass line 15 makes a U-turn, the return line being hidden in the side view of the drawing. The second by-pass line 15 returns to the main line just upstream of the valve 14. Downstream of the U-turn is the outlet 8. A vent line 20 connects the pig station 16 to the outlet line 8. The vent line 20 serves to bring the pig to the rest position in the pig station 16 after returning from the coil. The outlet line 8 is provided with a valve 21 just upstream of the junction with the vent line 20. The vent line 20 is provided with valve 22.

To clean the circulation pump 9, the valves 13, 14 are used to close off the main coil and to open the by-pass line 10. Polymer emulsion contained within the isolated section encompassed by the actuation of the valves 13 and 14 is drained off via a valve 23 and a drain-off line 24 situated underneath the pipe running between the circulation pump 9 and the three-way valve 13.

Valves 18 and 22 are opened and valve 21 is closed. Alternatively, valve 21 is left open and valves 18 and 22 remain closed. Either of these two valve options provides an exit route for the solvent. The solvent may move up the vent line 20 to the outlet line 8 or more simply pass vertically up the line 8 through the valve 21. Above the valve 21 there is a pipe coupling 25 and immediately after this coupling 25 there is a three-way valve (not shown) which is used to transfer the solvent to a small bore line and which leads to a waste solvent bin. High temperature boiling solvent is pumped into the cleaning circuit from a solvent supply line 26 via the circulation pump 9. Air trapped inside the circuit is bled via a small valve 27 on the by-pass line 10 near the valve 14. The circulation pump 9 is then set running to provide a solvent circulation. The circulation aids the solubilisation of any polymer deposits. Jackets 28 on the pipes are heated with hot water, which results in an elevated solvent temperature and this too aids solubilisation. After a period of time of typically 15 to 45 minutes the solution is pumped out of the equipment via the valve 23. Optionally the circuit is refilled for a second wash or alternatively a small bleed of solvent is continuously pumped into the circuit during the cleaning cycle, such that it overflows to a bin or the like. When all the solution has been drained off, the circuit is filled with water phase, the valves 13, 14, 18 and 22 and/or 21 are returned to their original positions, after which production can be restarted.

The invention claimed is:

1. A polymerisation reactor comprising one or more circulation loops with one or more inlets for raw material, one or more outlets, and a circulation pump for circulating a reactor charge within the circulation loop, wherein a by-pass line by-passing the circulation pump connects a point of the loop upstream with a point of the loop downstream, both points being provided with a three-way valve, to form a short loop comprising the pump and a cleaning solvent inlet and a cleaning solvent discharge.

2. The reactor according to claim 1, wherein at least a part of the short loop and/or the by-pass line is provided with jackets connected to a heating medium source.

3. The reactor according to claim 2, wherein the heating medium source is heated water.

4. The reactor according to claim 1, wherein the circulation pump is a positive displacement pump or a centrifugal pump.

5. The reactor according to claim 2, wherein the circulation pump is a positive displacement pump or a centrifugal pump.

6. A method of cleaning a section of a loop reactor comprising a circulating pump for circulating a reactor charge within said loop, wherein the section is isolated from the circulation loop by three-way valves connecting the section to a by-pass line to form a short circuit via the pump, the method comprising: letting solvent into the short-circuited section via a solvent inlet in the short-circuited section; and circulating the solvent through the short-circuited section one or more times and subsequently draining off the solvent via a solvent discharge outlet.

7. The method according to claim 6, further comprising subsequently actuating the two three-way valves to close off the by-pass line and to connect the short-circuited section to the other part of the circulation loop.

8. The method according to claim 6, wherein at least a part of the by-pass line and/or the short-circuited section is heated by a heating medium flowing through jackets.

9. The method according to claim 6, wherein during circulation of the solvent, a small bleed of solvent is continuously pumped into the short-circuited section, while at the same rate used solvent continuously overflows via an outlet to a container.

10. The method according to claim 7, wherein at least a part of the by-pass line and/or the short-circuited section is heated by a heating medium flowing through jackets.

11. The method according to claim 7, wherein during circulation of the solvent, a small bleed of solvent is continuously pumped into the short-circuited section, while at the same rate used solvent continuously overflows via an outlet to a container.

12. The method according to claim 8, wherein during circulation of the solvent, a small bleed of solvent is continuously pumped into the short-circuited section, while at the same rate used solvent continuously overflows via an outlet to a container.

13. The method according to claim 10, wherein during circulation of the solvent, a small bleed of solvent is continuously pumped into the short-circuited section, while at the same rate used solvent continuously overflows via an outlet to a container.

14. The method according to claim 8, wherein the heating medium is heated water.

15. The method according to claim 10, wherein the heating medium is heated water.

16. The method according to claim 6, wherein the solvent is circulated for about 15 to 45 minutes.

17. The method according to claim 7, wherein the solvent is circulated for about 15 to 45 minutes.

18. The method according to claim 8, wherein the solvent is circulated for about 15 to 45 minutes.

19. The method according to claim 9, wherein the solvent is circulated for about 15 to 45 minutes.

20. The method according to claim 13, wherein the solvent is circulated for about 15 to 45 minutes.

\* \* \* \* \*